United States Patent
Snyder et al.

(10) Patent No.: US 7,457,015 B2
(45) Date of Patent: Nov. 25, 2008

(54) COLOR PRINTING

(75) Inventors: Trevor J. Snyder, Newberg, OR (US); Stephen M. Kroon, Sherwood, OR (US); Meng Yao, West Linn, OR (US); Michael C. Gordon, West Linn, OR (US)

(73) Assignee: Xerox Corporation, Norwalk, CT (US)

( * ) Notice: Subject to any disclaimer, the term of this patent is extended or adjusted under 35 U.S.C. 154(b) by 543 days.

(21) Appl. No.: 11/132,465

(22) Filed: May 18, 2005

(65) Prior Publication Data

US 2006/0268294 A1 Nov. 30, 2006

(51) Int. Cl.
*G03F 3/08* (2006.01)

(52) U.S. Cl. .................. 358/518; 358/1.9; 358/523

(58) Field of Classification Search ................. 358/1.9, 358/518, 3.06, 3.03, 534, 3.23, 3.22, 3.13, 358/523; 382/167
See application file for complete search history.

(56) References Cited

U.S. PATENT DOCUMENTS

| | | | | |
|---|---|---|---|---|
| 5,812,744 A * | 9/1998 | Allebach et al. | ............. | 358/1.9 |
| 5,973,803 A | 10/1999 | Cheung et al. | | |
| 6,250,733 B1 | 6/2001 | Yao et al. | | |
| 6,487,308 B1 * | 11/2002 | Ulichney et al. | ............ | 382/162 |
| 6,594,028 B1 * | 7/2003 | Hamamoto et al. | ........ | 358/1.15 |
| 6,650,436 B1 * | 11/2003 | Hamamoto et al. | .......... | 358/1.9 |
| 7,151,618 B2 * | 12/2006 | Yoshiaki | ..................... | 358/3.06 |
| 7,199,905 B2 * | 4/2007 | Sharma | ..................... | 358/3.04 |
| 2003/0103241 A1 * | 6/2003 | Sharma | ..................... | 358/3.06 |
| 2004/0109184 A1 * | 6/2004 | Ishii | ............................ | 358/1.9 |
| 2004/0169873 A1 * | 9/2004 | Nagarajan | .................. | 358/1.9 |
| 2004/0184056 A1 * | 9/2004 | Ikeda | ......................... | 358/1.9 |
| 2004/0239966 A1 * | 12/2004 | Larson | ...................... | 358/1.9 |
| 2005/0030565 A1 * | 2/2005 | Walmsley et al. | ............ | 358/1.9 |
| 2005/0052670 A1 * | 3/2005 | Nishikawa | ................... | 358/1.9 |
| 2005/0052671 A1 * | 3/2005 | Nishikawa | ................... | 358/1.9 |
| 2005/0068554 A1 * | 3/2005 | Yoshida | ..................... | 358/1.9 |
| 2006/0061782 A1 * | 3/2006 | Yao | ............................. | 358/1.9 |
| 2006/0215189 A1 * | 9/2006 | Yao | ............................. | 358/1.9 |
| 2006/0268294 A1 * | 11/2006 | Snyder et al. | ................ | 358/1.9 |
| 2006/0268295 A1 * | 11/2006 | Yao et al. | ..................... | 358/1.9 |

FOREIGN PATENT DOCUMENTS

GB 2 352 353 A 1/2001
GB 2 370 935 A 7/2002

OTHER PUBLICATIONS

European Search Report for Application No. 06114081.0-1228, dated May 6, 2008, 3 pages.

* cited by examiner

*Primary Examiner*—Mark K Zimmerman
*Assistant Examiner*—Elbert Tsang
(74) *Attorney, Agent, or Firm*—Fay Sharpe LLP

(57) ABSTRACT

A method of processing cyan, magenta and yellow color values including half-toning cyan and magenta colors values, and half-toning yellow color values in such a manner that yellow dots tend to be printed next to cyan, magenta or secondary color dots regardless of cyan, magenta, or yellow coverages.

12 Claims, 4 Drawing Sheets

FIG. 1
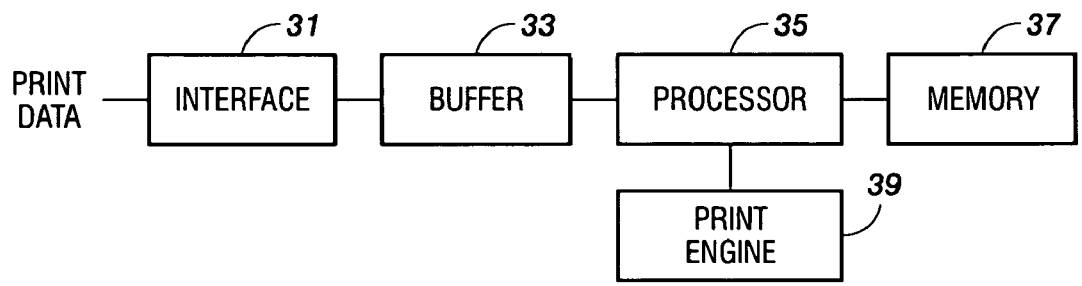
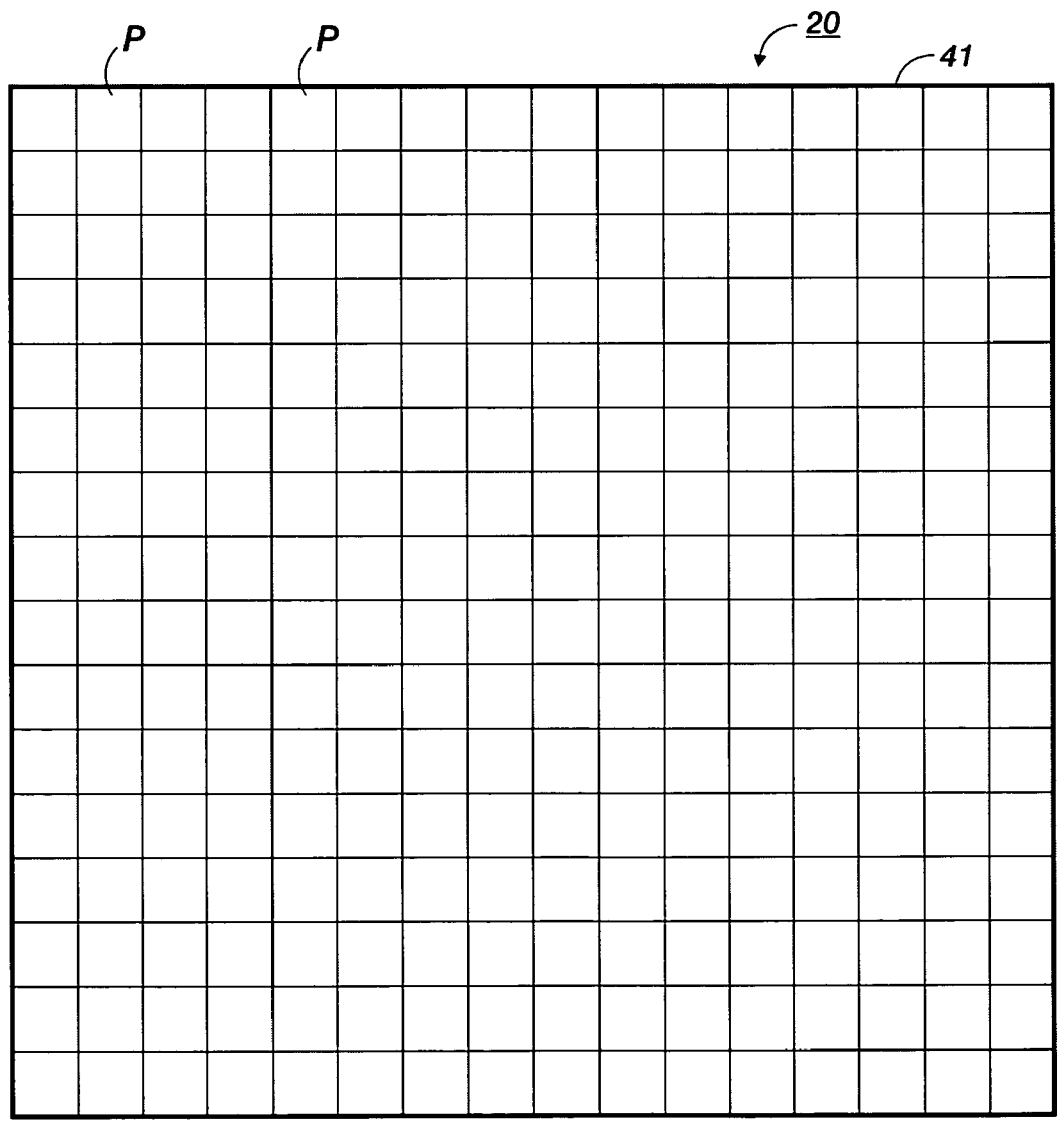
FIG. 2

| 184 | 11 | 224 | 51 | 252 | 17 | 114 | 241 | 128 | 79 | 22 | 140 | 57 | 215 | 160 | 49 |
|---|---|---|---|---|---|---|---|---|---|---|---|---|---|---|---|
| 236 | 69 | 133 | 107 | 170 | 70 | 196 | 38 | 155 | 191 | 228 | 90 | 185 | 104 | 27 | 86 |
| 115 | 163 | 40 | 209 | 2 | 142 | 96 | 220 | 73 | 119 | 55 | 162 | 13 | 254 | 141 | 208 |
| 8 | 187 | 244 | 81 | 183 | 238 | 29 | 171 | 12 | 246 | 35 | 205 | 126 | 43 | 177 | 61 |
| 145 | 101 | 23 | 154 | 116 | 52 | 137 | 201 | 103 | 147 | 181 | 85 | 230 | 76 | 111 | 239 |
| 44 | 217 | 63 | 229 | 32 | 210 | 92 | 59 | 225 | 66 | 123 | 9 | 151 | 212 | 16 | 194 |
| 82 | 122 | 178 | 132 | 74 | 172 | 253 | 5 | 165 | 42 | 240 | 199 | 98 | 50 | 130 | 159 |
| 30 | 251 | 3 | 202 | 106 | 18 | 143 | 113 | 197 | 138 | 78 | 33 | 175 | 247 | 65 | 222 |
| 169 | 88 | 152 | 46 | 237 | 189 | 67 | 219 | 25 | 105 | 214 | 156 | 121 | 4 | 186 | 109 |
| 203 | 53 | 221 | 124 | 77 | 158 | 39 | 95 | 168 | 245 | 14 | 68 | 233 | 93 | 148 | 20 |
| 97 | 136 | 15 | 176 | 34 | 213 | 135 | 234 | 45 | 87 | 146 | 193 | 37 | 207 | 48 | 243 |
| 60 | 232 | 192 | 94 | 250 | 108 | 0 | 190 | 125 | 206 | 58 | 112 | 164 | 83 | 131 | 179 |
| 1 | 157 | 72 | 26 | 153 | 54 | 166 | 75 | 21 | 161 | 226 | 10 | 255 | 24 | 223 | 117 |
| 91 | 211 | 127 | 235 | 118 | 200 | 227 | 100 | 248 | 47 | 134 | 182 | 99 | 149 | 56 | 195 |
| 249 | 62 | 19 | 180 | 41 | 84 | 28 | 144 | 188 | 110 | 71 | 36 | 204 | 80 | 174 | 31 |
| 102 | 150 | 198 | 89 | 139 | 216 | 173 | 64 | 6 | 218 | 167 | 242 | 120 | 7 | 231 | 129 |

*FIG. 5*

HALF-TONE USING:
IF B > t, C AND M DOTS ARE ON
ELSE IF B+Mout > t, M DOT IS ON
ELSE IF B+Mout+Cout > t,
    C DOT IS ON
IF Y > t', Y DOT IS ON

COLOR PRINTING

BACKGROUND

The subject disclosure is generally directed to color printer half-toning.

Raster type printers, which have been implemented with various print engines such as electrophotographic print engines and ink jet print engines, commonly employ half-toning to transform continuous tone image data to print data that can be printed as an array of dots that can be of substantially similar size. For example, 24 bit/pixel continuous tone image data can be half-toned to a plurality of single color one-bit per pixel bit-maps.

BRIEF DESCRIPTION OF DRAWINGS

FIG. 1 is a schematic block diagram of an embodiment of a printing system.

FIG. 2 is a schematic illustration of an embodiment of a pixel array.

FIG. 5 is a schematic diagram of an embodiment of a stochastic threshold array.

FIG. 6 is a schematic flow diagram of an embodiment of an alternative step that can be employed in the procedure of FIG. 4.

DETAILED DESCRIPTION

Figure 3:
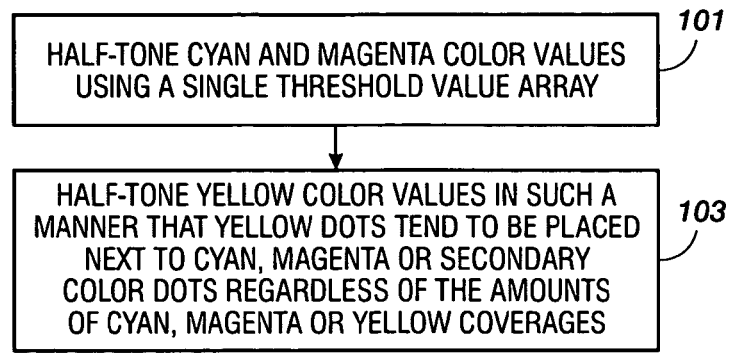
FIG. 3 is a schematic flow diagram of an embodiment of a procedure for printing.

FIG. 1 is a schematic block diagram of an embodiment of a printing apparatus that includes an interface 31 that receives print data, for example from a host computer, and stores the print data in a buffer memory 33. A processor 35 is configured to process the print data to produce bit mapped raster data that is stored in a memory 37. A print engine 39 prints an image pursuant to the bit mapped raster data generated by the processor 35. The print engine 39 can be an electrophotographic print engine or an ink jet print engine, for example.

Printing is accomplished by selectively printing, depositing, applying or otherwise forming markings such as dots on a receiver surface or substrate that can be a print output medium such as paper or a transfer surface such as a transfer belt or drum. If a transfer surface is used, the image formed or printed on the transfer surface is appropriately transferred to a print output medium such as paper.

FIG. 2 is a schematic illustration of an embodiment of an array 20 of pixel locations P that can be used to define the locations on a print output medium 41 that can be marked or printed. A marking of a particular primary color (e.g., cyan magenta, yellow or black) that is printed or deposited at a pixel location can be conveniently called a dot.

Each pixel location P can, for example, be marked or printed with (a) one or more non-black primary color dots (e.g., cyan, magenta or yellow), (b) a black dot by itself, or (c) a black dot and at least one non-black primary color dot.

Print data typically comprises continuous tone data (such as 32-bit or 24-bit pixel data), and halftoning (e.g., using one or more halftone threshold arrays) is commonly employed to map or transform continuous tone data to a halftoned bit map that contains one bit per pixel per primary color plane, for example.

FIG. 3 is a schematic flow diagram of an embodiment of a procedure for processing cyan, magenta, and yellow print data. At 101 the cyan and magenta color values are half-toned, for example using a single threshold array. At 103 the yellow color values are half-toned in such a manner that yellow dots tend to be printed next to cyan, magenta or secondary color dots, regardless of the amounts of coverage of cyan, magenta or yellow.

Figure 4:
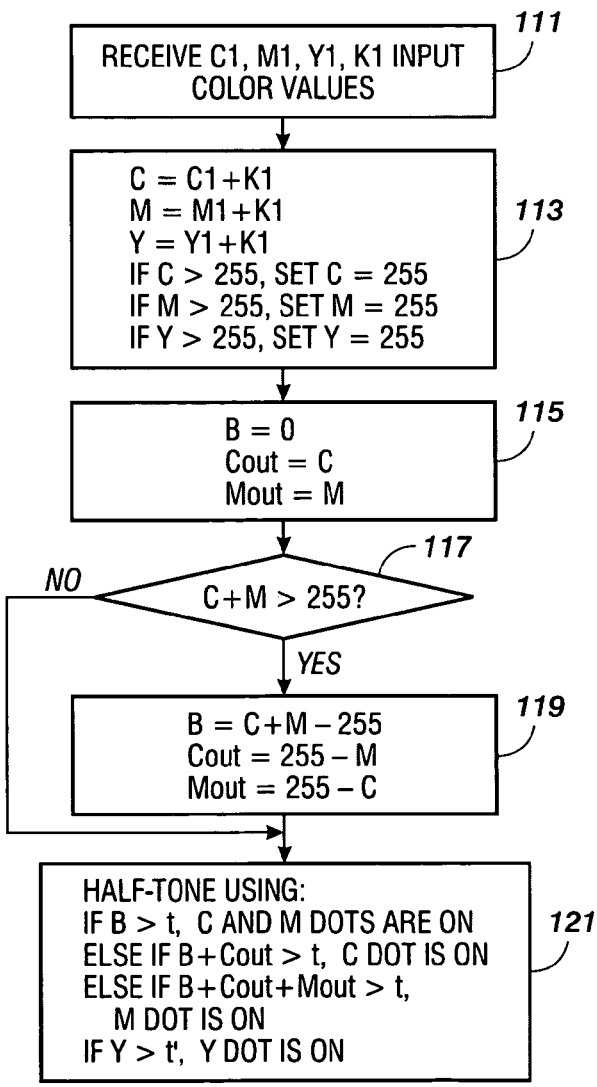
FIG. 4 is a schematic flow diagram of an embodiment of a procedure for printing a pixel of print data.

FIG. 4 is a schematic flow diagram of an embodiment of a procedure for printing a pixel of CMYK print data. At 111 cyan, magenta, yellow, and black input color values C1, M1, Y1, K1 are received. At 113 the input color values C1, M1, Y1, K1 are transformed to cyan, magenta, and yellow color values C, M, Y, for example in such a manner that each of C, M, Y is not greater than a predetermined maximum value such as 255 (for example for 8-bit color values):

$$C = C1 + K1$$

$$M = M1 + K1$$

$$Y = Y1 + K1$$

If $C > 255$, set $C = 255$

If $M > 255$, set $M = 255$

If $Y > 255$, set $Y = 255$

At 115, a blue color value B for overlapping cyan and magenta is initialized to zero (0), and the cyan and magenta output color values Cout, Mout are initialized to the cyan and magenta values C, M:

$$B = 0$$

$$\text{Cout} = C$$

$$\text{Mout} = M$$

At 117, a determination is made as to whether C+M is greater than 255. If no, processing continues at 121.

If the determination at 117 is yes, at 119 values for B, Cout, and Mout are calculated, for example such that B+Cout+Mout=255:

$$B = C + M - 255$$

$$\text{Cout} = 255 - M$$

$$\text{Mout} = 255 - C$$

The equation B+Cout+Mout=255 is based on having no white space since C+M>255. The Equation B=C+M−255 identifies the overlapping cyan and magenta dots as being the amount of C+M that exceeds 255. The foregoing exemplary expressions for Cout and Mout also satisfy the equations C=B+Cout and M=B+Mout, which can provide for printing of the total number of cyan and magenta dots requested by the CMYK color data.

At 121 half-toning is performed using the following, for example using a single stochastic half-tone threshold array A1 having threshold values t scaled to [0, 255] for cyan and magenta, and a stochastic half-tone threshold array A1' having threshold values t' scaled to [0, 255] for yellow, for the illustrative example wherein the predetermined maximum combined color value is 255.

```
If B>t,              C, M dots are on
Else if B+Cout>t,         C dot is on
Else if B+Cout+Mout>t,    M dot is on
If Y>t',                  Y dot is on
```

The threshold array A1' is derived by shifting the threshold array A1 by one pixel, such that the threshold array A1' comprises a one-pixel shifted version of the threshold array A1. FIG. 5 schematically illustrates an embodiment of a stochastic half-tone threshold array that can be employed as the threshold arrays A1, A1'.

As a result of configuring the threshold array A1' as a one-pixel shifted replica of the threshold array A1, a yellow dot will be placed next to a blue, cyan or magenta dot, to the extent a blue, cyan or magenta dot is available. More generally, yellow dots tend to be located next to blue, cyan, or magenta or cyan dots regardless of the color values or coverage amounts.

FIG. 6 sets forth an embodiment of an alternative half-toning step 221' that can be substituted 221 in the procedure of FIG. 3:

| | |
|---|---|
| If B>t, | C, M dots are on |
| Else if B+Mout>t, | M dot is on |
| Else if B+ Mout+Cout>t, | C dot is on |
| If Y>t', | Y dot is on |

Such half-toning can be performed, for example, using a single stochastic half-tone threshold array A1 having threshold values t scaled to [0, 255] for cyan and magenta, and a stochastic half-tone threshold array A2 having threshold values t' scaled to [0, 255] for yellow, for the illustrative example wherein the predetermined maximum combined color value is 255. The threshold array A1' is derived by shifting the threshold array A1 by one pixel, such that the threshold array A1' comprises a one-pixel shifted version of the threshold array A1. FIG. 4 schematically illustrates an embodiment of a stochastic half-tone threshold array that can be employed as the threshold arrays A1, A1'.

Pursuant to the foregoing, cyan and magenta dots are substantially uniformly distributed, and overlapping cyan and magenta dots are reduced.

As a result of configuring the threshold array A1' as a one-pixel shifted replica of the threshold array A1, a yellow dot will be placed next to a blue, magenta or cyan dot, to the extent a blue, magenta or cyan dot is available. More generally, yellow dots tend to be located next to blue, magenta or cyan dots regardless of the color values or coverage amounts.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A computer operable method of processing cyan, magenta, and yellow color values C1, M1, Y1, comprising:
   receiving input values C1, M1, Y1, K1 through use of input means;
   transforming the C1, M1, Y1 color values to continuous tone data of the color values cyan, magenta, and yellow color values C, M, Y through use of the value K1 in such a manner that each of C, M, Y is not greater than a predetermined maximum value VMAX;
   obtaining blue, cyan, and magenta output color values by setting B=0, Cout=C, and Mout=M;
   if the sum C+M is greater than VMAX, obtaining blue, cyan and magenta output color values B, Cout, Mout such that B+Cout+Mout=VMAX
   half-toning B, Cout, Mout and Y using a first threshold array A1 for B, Cout, and Mout, and a second threshold array A1' for Y, wherein the second threshold array A1' is a replica of the first threshold array A1 that is shifted in at least one of a horizontal/vertical, left/right, or up/down direction relative to the first threshold array A1 by one pixel.

2. The method of claim 1 wherein half-toning B, Cout, Mout and Y comprises half-toning B, Cout, Mout and Y using:

| | |
|---|---|
| If B>t, | C, M dots are on |
| Else if B+Cout>t, | C dot is on |
| Else if B+Cout+Mout>t, | M dot is on |
| If Y>t', | Y dot is on | wherein t is a threshold value of the first threshold array A1 and t' is a threshold value of the second threshold array A1'.

3. The method of claim 1 wherein half-toning B, Cout, Mout and Y comprises half-toning B, Cout, Mout and Y using:

| | |
|---|---|
| If B>t, | C, M dots are on |
| Else if B+Mout>t, | M dot is on |
| Else if B+ Mout+Cout>t, | C dot is on |
| If Y>t', | Y dot is on | wherein t is a threshold value of the first threshold array A1 and t' is a threshold value of the second threshold array A1'.

4. The method of claim 1 wherein transforming C1, M1, Y1 comprises:

$C=C1$ $M=M1$ $Y=Y1$

If C>VMAX, set C=VMAX

If M>VMAX, set M=VMAX

If Y>VMAX, set Y=VMAX.

5. The method of claim 1 wherein obtaining blue, cyan and magenta output color values B, Cout, Mout such that B+Cout+Mout=VMAX comprises obtaining blue, cyan and magenta output color values B, Cout, Mout using:

$B=C+M-\text{VMAX}$ $Cout=\text{VMAX}-M$ $Mout=\text{VMAX}-C.$

6. A computer operable method of processing cyan, magenta, yellow and black color values C1, M1, Y1, K1 comprising:
   receiving input values C1, M1, Y1, K1 through use of input means;
   transforming the C1, M1, Y1, K1 color values to continuous tone data of the color values cyan, magenta, and yellow color values c, M, Y through use of the value K1 in such a manner that each of C,M, Y is not greater than a predetermined maximum value VMAX;

obtaining blue, cyan, and magenta output color values by setting B=0, Cout=C, and Mout=M;

if the sum C+M is greater than VMAX, obtaining blue, cyan and magenta output color values B, Cout, Mout such that B+Cout+Mout=VMAX; and half-toning B, Cout, Mout and Y using a first threshold array A1 for Cout and Mout, and a second threshold array A1' for Y, wherein the second threshold array A1' is a replica of the first threshold array A1 that is shifted relative to the first threshold array A1 by one pixel.

7. The method of claim 6 wherein half-toning B, Cout, Mout and Y using a first threshold array A1 for B, Cout and Mout, and a second threshold array A' for Y comprises half-toning B, Cout, Mout and Y using:

```
If B>t,            C, M dots are on
Else if B+Cout>t,         C dot is on
Else if B+Cout+Mout>t,         M dot is on
If Y>t',              Y dot is on
``` wherein it is a threshold value of a first threshold array A1, and t' is a threshold value of a second threshold array A1'.

8. The method of claim 6 wherein half-toning B, Cout, Mout and Y using a first threshold array A1 for B, Cout and Mout, and a second threshold array A' for Y comprises half-toning B, Cout, Mout and Y using:

```
If B>t,            C, M dots are on
Else if B+Mout>t,         M dot is on
Else if B+Mout+Cout>t,         C dot is on
If Y>t',              Y dot is on
``` wherein t is a threshold value of a first threshold array A1, and t' is a threshold value of a second threshold array A1'.

9. The method of claim 6 wherein transforming C1, M1, Y1, K1 comprises:

$$C = C1 + K1$$

$$M = M1 + K1$$

$$Y = Y1 + K1$$

If C>VMAX, set C=VMAX

If M>VMAX, set M=VMAX

If Y>VMAX, set Y=VMAX.

10. The method of claim 6 wherein obtaining blue, cyan and magenta output color values B, Cout, Mout such that B+Cout+Mout=VMAX comprises obtaining blue, cyan and magenta output color values B, Cout, Mout using:

$$B = C + M - \text{VMAX}$$

$$Cout = \text{VMAX} - M$$

$$Mout = \text{VMAX} - C.$$

11. A method of processing cyan, magenta and yellow color values comprising:

half-toning cyan and magenta colors values;

half-toning yellow color values in such a manner that yellow dots tend to be printed next to cyan, magenta or secondary color dots regardless of cyan, magenta, or yellow coverages.

12. The method of claim 11 wherein:

half-toning cyan and magenta color values comprises half-toning cyan and magenta color values using a threshold array A1;

half-toning yellow color values comprises half-toning yellow color values using a threshold array A1, wherein the threshold array A1' is a one pixel shifted replica of the threshold array A1.

* * * * *